United States Patent
Bossemeyer, Jr.

(10) Patent No.: US 6,249,760 B1
(45) Date of Patent: *Jun. 19, 2001

(54) APPARATUS FOR GAIN ADJUSTMENT DURING SPEECH REFERENCE ENROLLMENT

(75) Inventor: Robert Wesley Bossemeyer, Jr., St. Charles, IL (US)

(73) Assignee: Ameritech Corporation, Hoffman Estates, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/436,296

(22) Filed: Nov. 8, 1999

Related U.S. Application Data

(63) Continuation of application No. 09/436,296, filed on Nov. 8, 1999, now abandoned, which is a continuation of application No. 08/932,078, filed on Sep. 17, 1997, now Pat. No. 6,012,027, which is a continuation-in-part of application No. 08/863,462, filed on May 27, 1997.

(51) Int. Cl.[7] .................................................. G10L 15/28
(52) U.S. Cl. ................................................................ 704/225
(58) Field of Search ................................................ 704/225

(56) References Cited

U.S. PATENT DOCUMENTS

| | | | | |
|---|---|---|---|---|
| 4,535,473 | * | 8/1985 | Sakata | 704/248 |
| 4,630,305 | * | 12/1986 | Borth et al. | 381/94.3 |
| 4,912,766 | * | 3/1990 | Forse | 704/225 |
| 4,937,870 | * | 6/1990 | Bossemeyer, Jr. | 704/241 |
| 5,742,694 | * | 4/1998 | Eatwell | 381/94.2 |

* cited by examiner

Primary Examiner—William R. Korzuch
Assistant Examiner—Donald L. Storm
(74) Attorney, Agent, or Firm—Dale B. Halling

(57) ABSTRACT

A speech recognition, verification and enrollment system includes an adjustable gain amplifier connected to an input speech signal. The output of the adjustable gain amplifier is examined to determine if the amplification is incorrect and the utterance should be discarded. A signal to noise (SNR) meter comparison of the output to a threshold determines if the gain amplification is incorrect, and may increase the gain by an incremental step. An amplitude comparison of the output of the adjustable gain amplifier to a saturation threshold may be included to determine if the gain amplification is incorrect, and reduce the gain by an incremental step. The circuit may be used for the input of several repeated utterances; it reduces the chances of passing a poor representation of utterance features to a feature comparator. Features are extracted that may include an amplitude histogram or the number of voiced speech frames that occur during a response time interval.

7 Claims, 15 Drawing Sheets

APPARATUS FOR GAIN ADJUSTMENT DURING SPEECH REFERENCE ENROLLMENT

This is a continuation of application Ser. No. 09/436,296, filed Nov. 8, 1999 and now abandoned.

This application is a continuation of the patent application having Ser. No. 08/932,078, filed Sep. 17, 1997, entitled "Criteria For Usable Repetitions Of An Utterance During Speech Reference Enrollment," now U.S. Pat. No. 6,012,027, which is a continuation-in-part of the patent application having Ser. No. 08/863,462, filed May 27, 1997, entitled "Method Of Accessing A Dial-Up Service."

FIELD OF THE INVENTION

The present invention is related to the field of speech recognition systems and more particularly to a speech reference enrollment method.

BACKGROUND OF THE INVENTION

Both speech recognition and speaker verification application often use an enrollment process to obtain reference speech patterns for later use. Speech recognition systems that use an enrollment process are generally speaker dependent systems. Both speech recognition systems using an enrollment process and speaker verification systems will be referred herein as speech reference systems. The performance of speech reference systems is limited by the quality of the reference patterns obtained in the enrollment process. Prior art enrollment processes ask the user to speak the vocabulary word being enrolled and use the extracted features as the reference pattern for the vocabulary word. These systems suffer from unexpected background noise occurring while the user is uttering the vocabulary word during the enrollment process. This unexpected background noise is then incorporated into the reference pattern. Since the unexpected background noise does not occur every time the user utters the vocabulary word, it degrades the ability of the speech reference system's ability to match the reference pattern with a subsequent utterance.

Thus there exists a need for an enrollment process for speech reference systems that does not incorporate unexpected background noise in the reference patterns.

SUMMARY OF THE INVENTION

A speech reference enrollment method that overcomes these and other problems involves the following steps: (a) requesting a user speak a vocabulary word; (b) detecting a first utterance; (c) requesting the user speak the vocabulary word; (d) detecting a second utterance; (e) determining a first similarity between the first utterance and the second utterance; (f) when the first similarity is less than a predetermined similarity, requesting the user speak the vocabulary word; (g) detecting a third utterance; (h) determining a second similarity between the first utterance and the third utterance; and (i) when the second similarity is greater than or equal to the predetermined similarity, creating a reference.

DETAILED DESCRIPTION OF THE DRAWINGS

A speech reference enrollment method as described herein can be used for both speaker verification methods and speech recognition methods. Several improvements in speaker verification methods that can be used in conjunction with the speech enrollment method are first described. Next a dial-up service that takes advantage of the enrollment method is described. The speech enrollment method is then described in detail.

Figure 1:
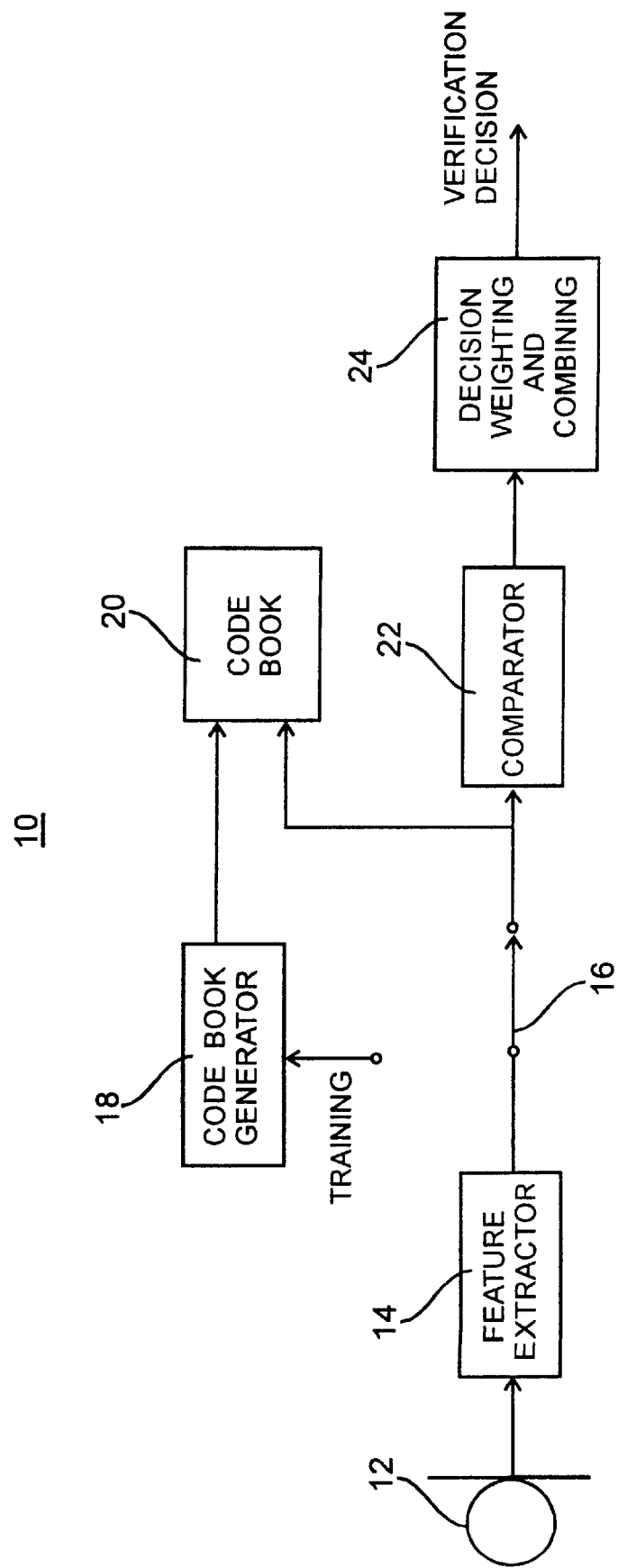
FIG. 1 is a block diagram of an embodiment of a speaker verification system.

FIG. 1 is a block diagram of an embodiment of a speaker verification system 10. It is important to note that the speaker verification system can be physically implemented in a number of ways. For instance, the system can be implemented as software in a general purpose computer connected to a microphone; or the system can be implemented as firmware in a general purpose microprocessor connected to memory and a microphone; or the system can be implemented using a Digital Signal Processor (DSP), a controller, a memory, and a microphone controlled by the appropriate software. Note that since the process can be performed using software in a computer, then a computer readable storage medium containing computer readable instructions can be used to implement the speaker verification method. These various system architectures are apparent to those skilled in the art and the particular system architecture selected will depend on the application.

A microphone 12 receives an input speech and converts the sound waves to an electrical signal. A feature extractor 14 analyzes the electrical signal and extracts key features of the speech. For instance, the feature extractor first digitizes the electrical signal. A cepstrum of the digitized signal is then performed to determine the cepstrum coefficients. In another embodiment, a linear predictive analysis is used to find the linear predictive coding (LPC) coefficients. Other feature extraction techniques are also possible.

A switch 16 is shown attached to the feature extractor 14. This switch 16 represents that a different path is used in the training phase than in the verification phase. In the training phase the cepstrum coefficients are analyzed by a code book generator 18. The output of the code book generator 18 is stored in the code book 20. In one embodiment, the code book generator 18 compares samples of the same utterance from the same speaker to form a generalized representation of the utterance for that person. This generalized representation is a training utterance in the code book. The training utterance represents the generalized cepstrum coefficients of a user speaking the number "one" as an example. A training utterance could also be a part of speech, a phoneme, or a number like "twenty one" or any other segment of speech. In addition to the registered users' samples, utterances are taken from a group of non-users. These utterances are used to form a composite that represents an impostor code having a plurality of impostor references.

In one embodiment, the code book generator 18 segregates the speakers (users and non-users) into male and female groups. The male enrolled references (male group) are aggregated to determining a male variance vector. The female enrolled references (female group) are aggregated to determine a female variance vector. These gender specific variance vectors will be used when calculating a weighted Euclidean distance (measure of closeness) in the verification phase.

In the verification phase the switch 16 connects the feature extractor 14 to the comparator 22. The comparator 22 performs a mathematical analysis of the closeness between a test utterance from a speaker with an enrolled reference stored in the code book 20 and between the test utterance and an impostor reference distribution. In one embodiment, a test utterance such as a spoken "one" is compared with the "one" enrolled reference for the speaker and the "one" impostor reference distribution. The comparator 22 determines a measure of closeness between the "one" enrolled reference, the "one" test utterance and the "one" impostor reference distribution. When the test utterance is closer to the enrolled reference than the impostor reference distribution, the speaker is verified as the true speaker. Otherwise the speaker is determined to be an impostor. In one embodiment, the measure of closeness is a modified weighted Euclidean distance. The modification in one embodiment involves using a generalized variance vector instead of an individual variance vector for each of the registered users. In another embodiment, a male variance vector is used for male speakers and a female variance vector is used for a female speaker.

A decision weighting and combining system 24 uses the measure of closeness to determine if the test utterance is closest to the enrolled reference or the impostor reference distribution. When the test utterance is closer to the enrolled reference than the impostor reference distribution, a verified decision is made. When the test utterance is not closer to the enrolled reference than the impostor reference distribution, an unverified decision is made. These are preliminary decisions. Usually, the speaker is required to speak several utterances (e.g., "one", "three", "five", "twenty one"). A decision is made for each of these test utterances. Each of the plurality of decisions is weighted and combined to form the verification decision.

The decisions are weighted because not all utterances provide equal reliability. For instance, "one" could provide a much more reliable decision than "eight". As a result, a more accurate verification decision can be formed by first weighting the decisions based on the underlying utterance. Two weighting methods can be used. One weighting method uses a historical approach. Sample utterances are compared to the enrolled references to determine a probability of false alarm $P_{FA}$ (speaker is not impostor but the decision is impostor) and a probability of miss $P_M$ (speaker is impostor but the decision is true speaker). The $P_{FA}$ and $P_M$ are probability of errors. These probability of errors are used to weight each decision. In one embodiment the weighting factors (weight) are described by the equation below:

$$a_i = \log \frac{1 - P_{Mi}}{P_{FAi}} \quad \text{Decision is Verified (True Speaker)}$$

$$a_i = \log \frac{P_{Mi}}{1 - P_{FAi}} \quad \text{Decision is Not Verified (Impostor)}$$

When the sum of the weighted decisions is greater than zero, then the verification decision is a true speaker. Otherwise the verification decision is an impostor.

The other method of weighting the decisions is based on an immediate evaluation of the quality of the decision. In one embodiment, this is calculated by using a Chi-Squared detector. The decisions are then weighted on the confidence determined by the Chi-Squared detector. In another embodiment, a large sample approximation is used. Thus if the test statistics are t, find b such that $c^2(b)=t$. Then a decision is an impostor if it exceeds the 1-a quantile of the $c^2$ distribution.

One weighting scheme is shown below:

1.5, if $b > c_{accept}$ 1.0, if $1-a \leq b \leq c_{accept}$

−1.0, if $c_{reject} \leq b \leq 1-a$

−1.25, if $b < c_{reject}$

When the sum of the weighted decisions is greater than zero, then the verification decision is a true speaker. When the sum of the weighted decision is less than or equal to zero, the decision is an impostor.

In another embodiment, the feature extractor 14 segments the speech signal into voiced sounds and unvoiced sounds. Voiced sounds generally include vowels, while most other sounds are unvoiced. The unvoiced sounds are discarded before the cepstrum coefficients are calculated in both the training phase and the verification phase.

These techniques of weighting the decisions, using gender dependent cepstrums and only using voiced sounds can be combined or used separately in a speaker verification system.

Figure 2:
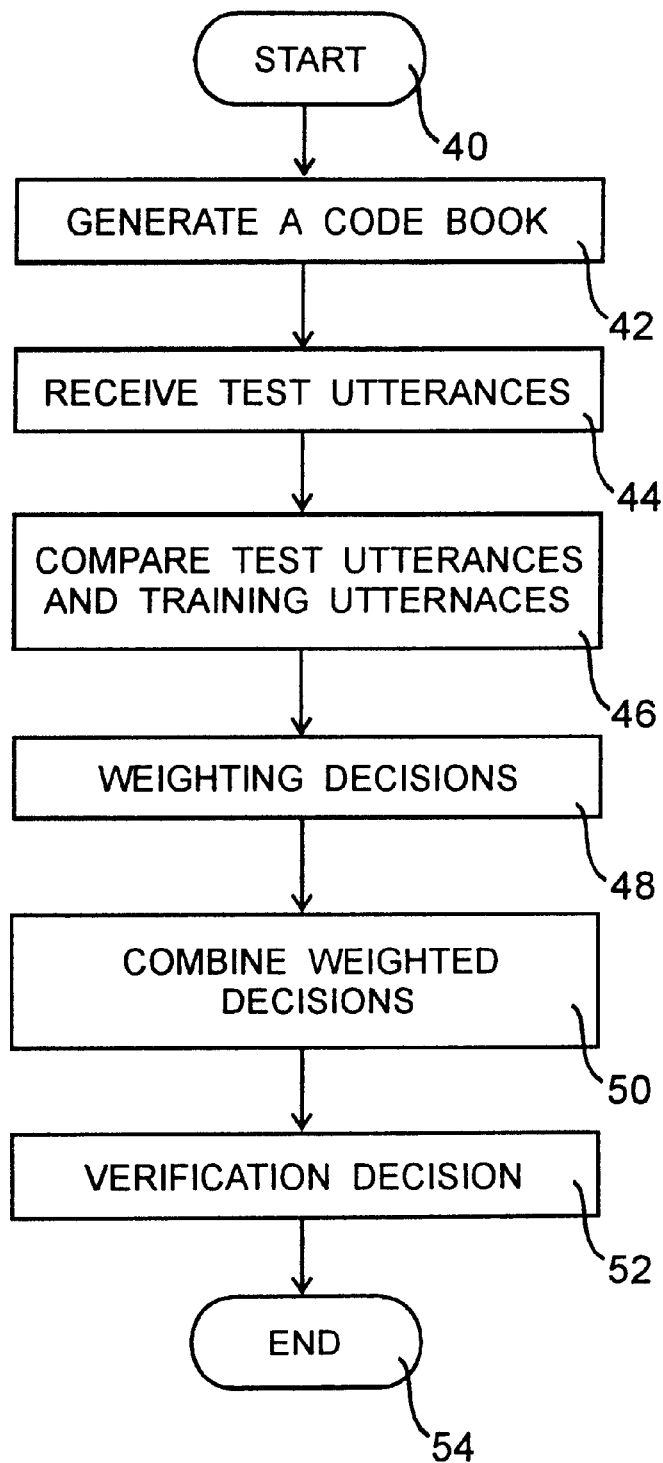
FIG. 2 is a flow chart of an embodiment of the steps used to form a speaker verification decision.

FIG. 2 is a flow chart of an embodiment of the steps used to form a speaker verification decision. The process starts, at step 40, by generating a code book at step 42. The code book has a plurality of enrolled references for each of the plurality of speakers (registered users, plurality of people) and a plurality of impostor references. The enrolled references in one embodiment are the cepstrum coefficients for a particular user speaking a particular utterance (e.g., "one"). The enrolled references are generated by a user speaking the utterances. The cepstrum coefficients of each of the utterances are determined to from the enrolled references. In one embodiment a speaker is asked to repeat the utterance and a generalization of the two utterances is saved as the enrolled reference. In another embodiment both utterances are saved as enrolled reference.

In one embodiment, a data base of male speakers is used to determine a male variance vector and a data base of female speakers is used to determine a female variance vector. In another embodiment, the data bases of male and female speakers are used to form a male impostor code book and a female impostor code book. The gender specific variance vectors are stored in the code book. At step 44, a plurality of test utterances (input set of utterances) from a speaker are received. In one embodiment the cepstrum coefficients of the test utterances are calculated. Each of the plurality of test utterances are compared to the plurality of enrolled references for the speaker at step 46. Based on the comparison, a plurality of decision are formed, one for each of the plurality of enrolled references. In one embodiment, the comparison is determined by a Euclidean weighted distance between the test utterance and the enrolled reference and between the test utterance and an impostor reference distribution. In another embodiment, the Euclidean weighted distance is calculated with the male variance vector if the speaker is a male or the female variance vector if the speaker is a female. Each of the plurality of decisions are weighted to form a plurality of weighted decisions at step 48. The weighting can be based on historical error rates for the utterance or based on a confidence level (confidence measure) of the decision for the utterance. The plurality of weighted decisions are combined at step 50. In one embodiment the step of combining involves summing the weighted decisions. A verification decision is then made based on the combined weighted decisions at step 52, ending the process at step 54. In one embodiment if the sum is greater than zero, the verification decision is the speaker is a true speaker, otherwise the speaker is an impostor.

Figure 3:
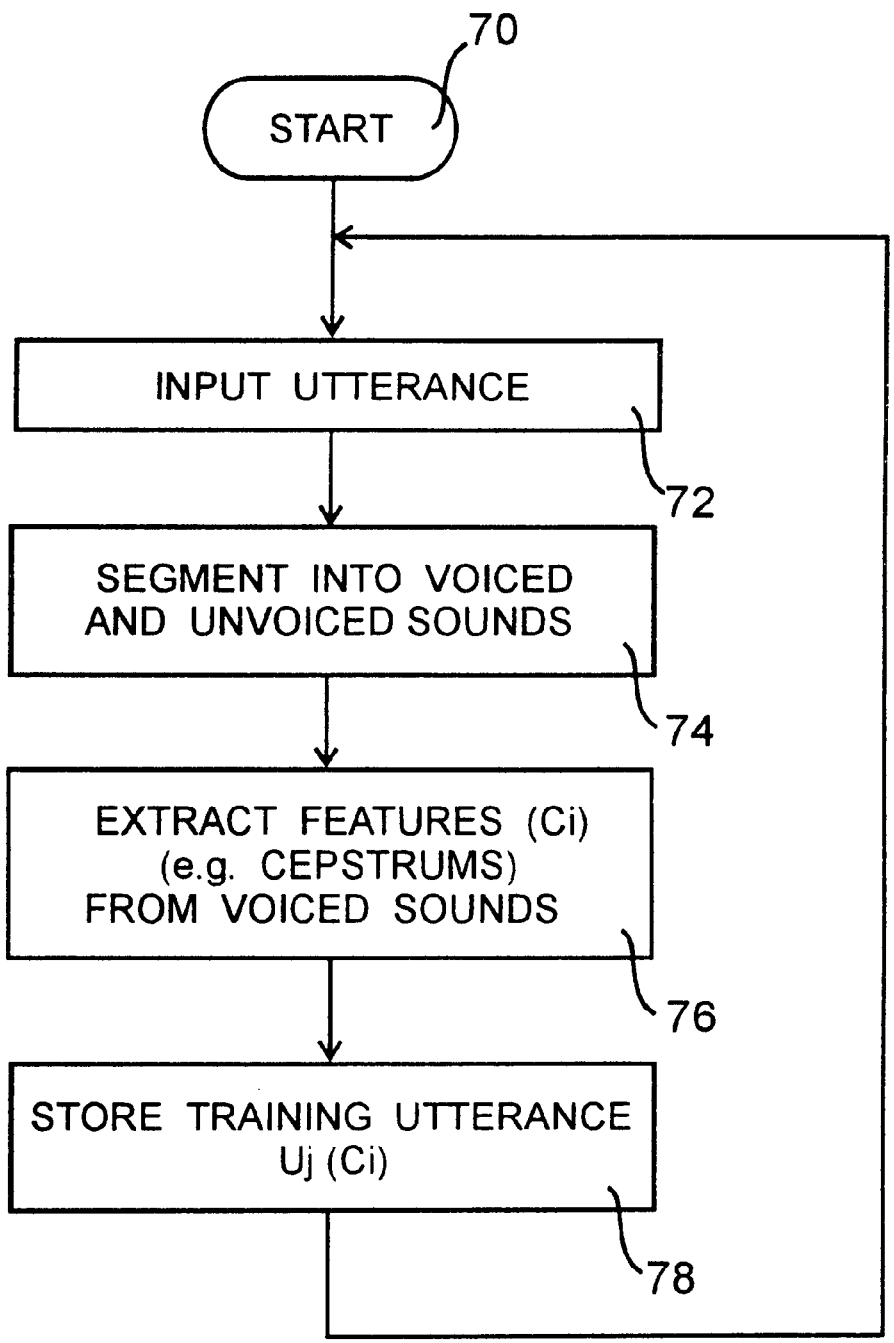
FIG. 3 is a flow chart of an embodiment of the steps used to form a code book for a speaker verification decision.

FIG. 3 is a flow chart of an embodiment of the steps used to form a code book for a speaker verification decision. The process starts, at step 70, by receiving an input utterance at step 72. In one embodiment, the input utterances are then segmented into a voiced sounds and an unvoiced sounds at step 74. The cepstrum coefficients are then calculated using the voiced sounds at step 76. The coefficients are stored as a enrolled reference for the speaker at step 78. The process then returns to step 72 for the next input utterance, until all the enrolled references have been stored in the code book.

Figure 4:
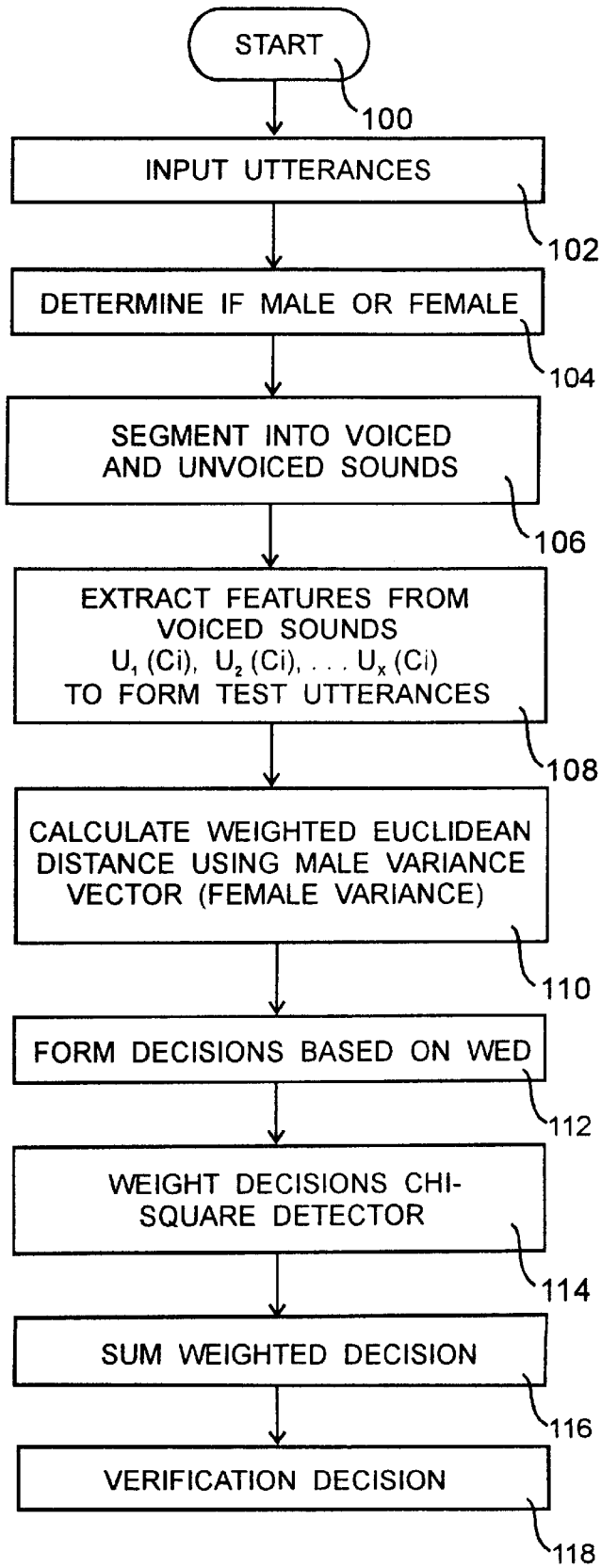
FIG. 4 is a flow chart of an embodiment of the steps used to form a speaker verification decision.

FIG. 4 is a flow chart of an embodiment of the steps used to form a speaker verification decision. The process starts, at step 100, by receiving input utterances at step 102. Next, it is determined if the speaker is male or female at step 104. In a speaker verification application, the speaker purports to be someone in particular. If the person purports to be someone that is a male, then the speaker is assumed to be male even if the speaker is a female. The input utterances are then segmented into a voiced sounds and an unvoiced sounds at step 106. Features (e.g., cepstrum coefficients) are extracted from the voiced sounds to form the test utterances, at step 108. At step 110, the weighted Euclidean distance (WED) is calculated using a generalized male variance vector if the purported speaker is a male. When the purported speaker is a female, the female variance vector is used. The WED is calculated between the test utterance and the enrolled reference for the speaker and the test utterance and the male (or female if appropriate) impostor reference distribution. A decision is formed for each test utterance based on the WED at step 112. The decisions are then weighted based on a confidence level (measure of confidence) determined using a Chi-squared detector at step 114. The weighted decisions are summed at step 116. A verification decision is made based on the sum of the weighted decisions at step 118.

Using the speaker verification decisions discussed above results in an improved speaker verification system, that is more reliable than present techniques.

Figure 5:
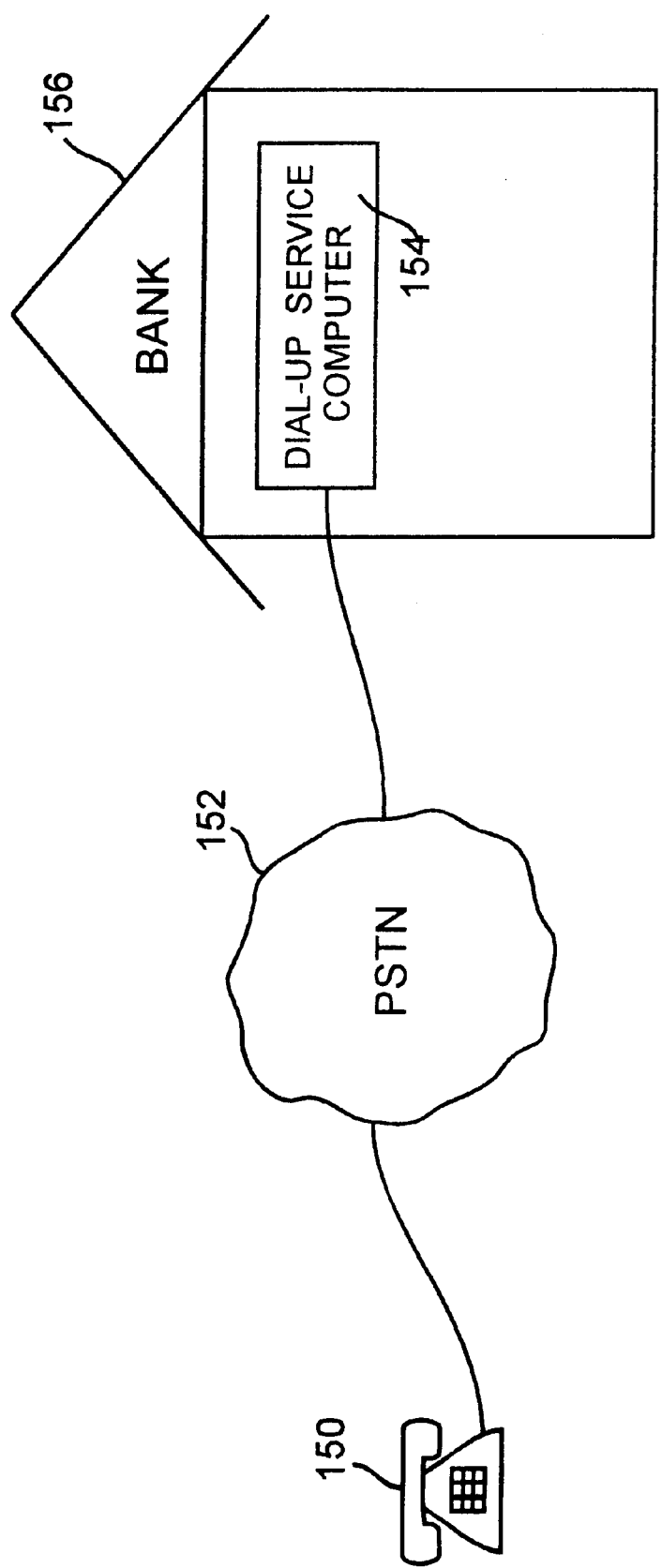
FIG. 5 is a schematic diagram of a dial-up service that incorporates a speaker verification method.
Figure 6:
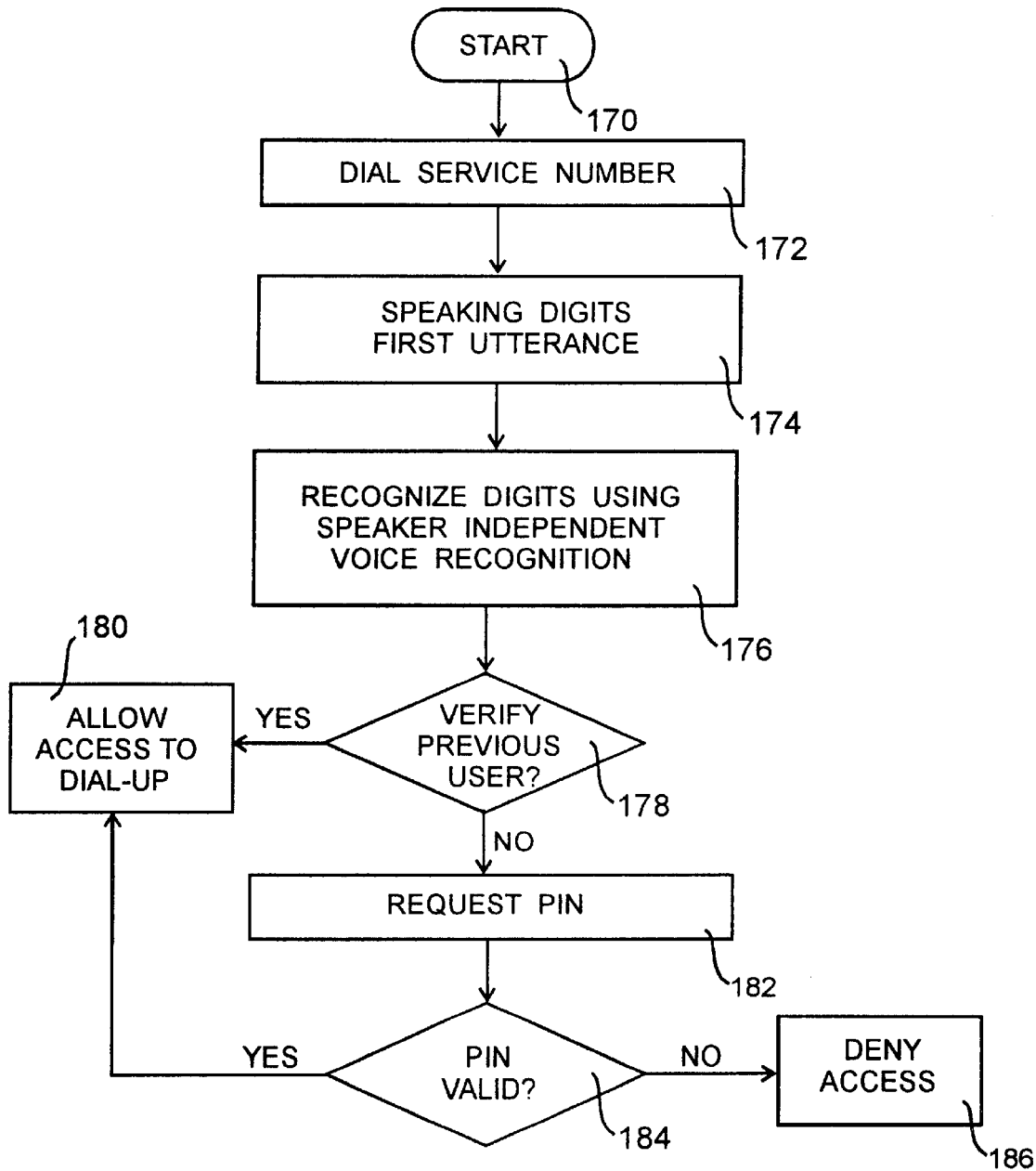
FIG. 6 is a flow chart of an embodiment of the steps used in a dial-up service.

A dial-up service that uses a speaker verification method as described above is shown in FIG. 5. The dial-up service is shown as a banking service, A user dials a service number on their telephone 150. The public switched telephone network (PSTN) 152 then connects the user's phone 150 with a dial-up service computer 154 at a bank 156. The dial-up service need not be located within a bank. The service will be explained in conjunction with the flow chart shown in FIG. 6. The process starts, at step 170, by dialing a service number (communication service address, number) at step 172. The user (requester) is then prompted by the computer 154 to speak a plurality of digits (access code, plurality of numbers, access number) to form a first utterance (first digitized utterance) at step 174. The digits are recognized using speaker independent voice recognition at step 176. When the user has used the dial-up service previously, verifying the user based on the first utterance at step 178. When the user is verified as a true speaker at step 178, allowing access to the dial-up service at step 180. When the user cannot be verified, requesting the user input a personal identification number (PIN) at step 182. The PIN can be entered by the user either by speaking the PIN or by entering the PIN on a keypad. At step 184 it is determined if the PIN is valid. When the PIN is not valid, the user is denied access at step 186. When the PIN is valid the user is allowed access to the service at step 180. Using the above method the dial-up service uses a speaker verification system as a PIN option, but does not deny access to the user if it cannot verify the user.

Figure 7:
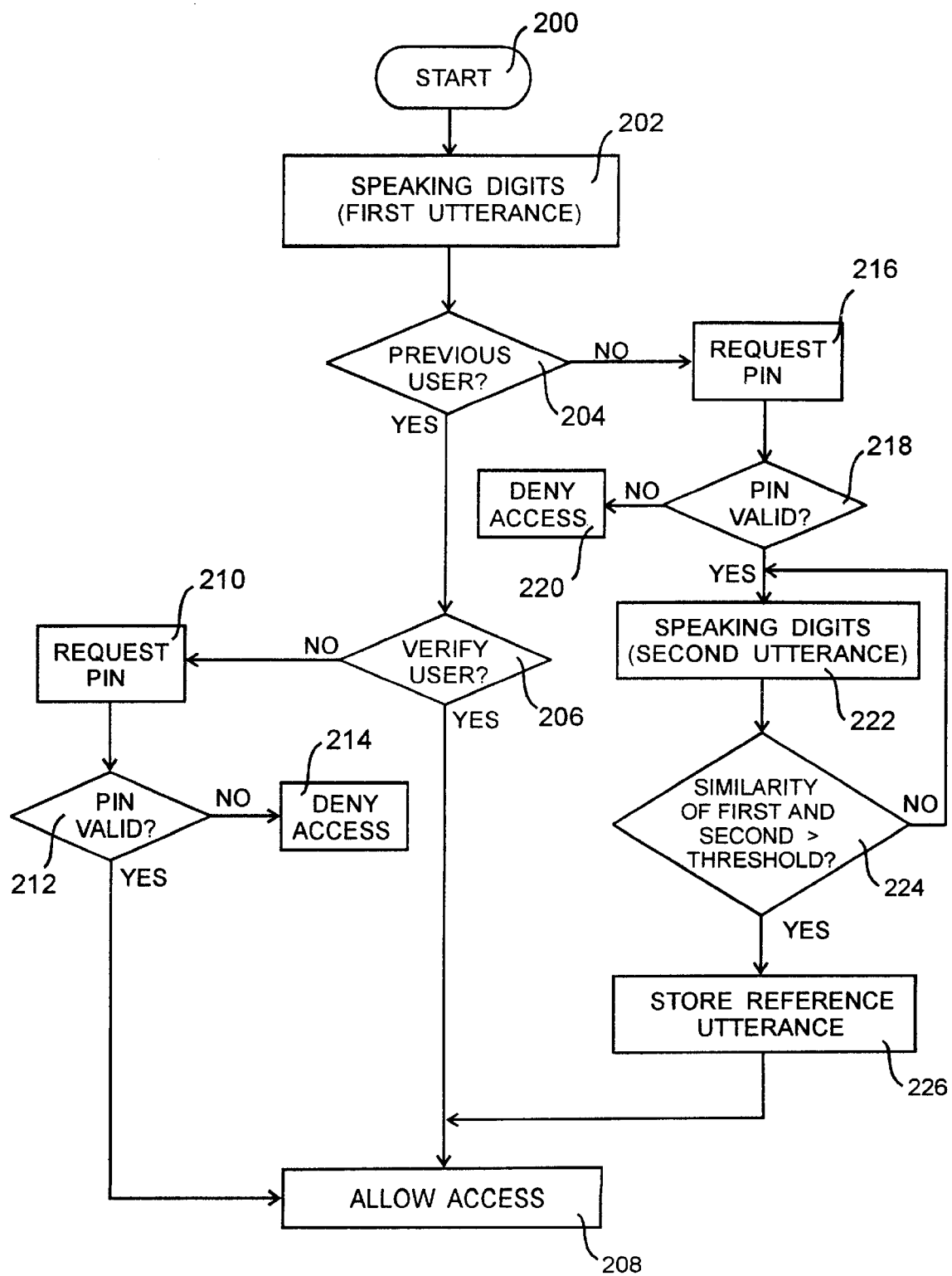
FIG. 7 is a flow chart of an embodiment of the steps used in a dial-up service.

FIG. 7 is a flow chart of another embodiment of the steps used in a dial-up service. The process starts, step 200, by the user speaking an access code to form a plurality of utterances at step 202. At step 204 it is determined if the user has previously accessed the service. When the user has previously used the service, the speaker verification system attempts to verify the user (identity) at step 206. When the speaker verification system can verify the user, the user is allowed access to the system at step 208. When the system cannot verify the user, a PIN is requested at step 210. Note the user can either speak the PIN or enter the PIN on a keypad. At step 212 it is determined if the PIN is valid. When the PIN is not valid the user is denied access at step 214. When the PIN is valid, the user is allowed access at step 208.

When the user has not previously accessed the communication service at step 204, the user is requested to enter a PIN at step 216. At step 218 it is determined if the PIN is valid at step 218. When the PIN is not valid, denying access to the service at step 220. When the PIN is valid the user is asked to speak the access code a second time to form a second utterance (plurality of second utterances, second digitized utterance) at step 222. The similarity between the first utterance (step 202) and the second utterance is compared to a threshold at step 224. In one embodiment the similarity is calculated using a weighted Euclidean distance. When the similarity is less than or equal to the threshold, the user is asked to speak the access code again at step 222. In this case the second and third utterances would be compared for the required similarity. In practice, the user would not be required to repeat the access code at step 222 more than once or twice and the system would then allow the user access. When the similarity is greater than the threshold, storing a combination of the two utterances as at step 226. In another embodiment both utterances are stored as enrolled references. Next access to the service is allowed at step 208. The enrolled reference is used to verify the user the next time they access the service. Note that the speaker verification part of the access to the dial-up service in one embodiment uses all the techniques discussed for a verification process. In another embodiment the verification process only uses one of the speaker verification techniques. Finally, in another embodiment the access number has a predetermined digit that is selected from a first set of digits (predefined set of digits) if the user is a male. When the user is a female, the predetermined digit is selected from a second set of digits. This allows the system to determine if the user is suppose to be a male or a female. Based on this information, the male variance vector or female variance vector is used in the speaker verification process.

Figure 8:
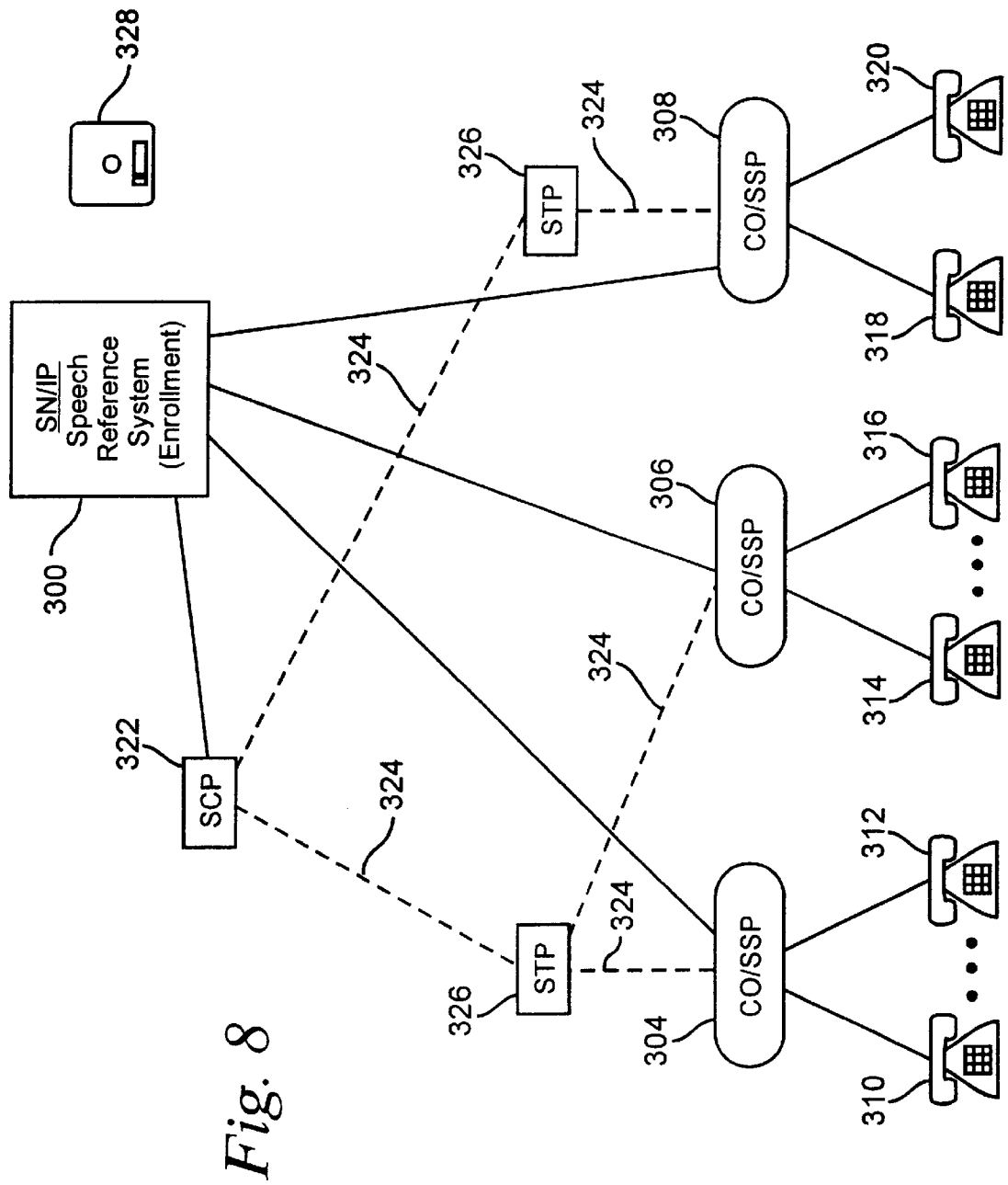
FIG. 8 is a block diagram of a speech reference system using a speech reference enrollment method according to the invention in an intelligent network phone system.

FIG. 8 is a block diagram of a speech reference system 300 using a speech reference enrollment method according to the invention in an intelligent network phone system 302. The speech reference system 300 can perform speech recognition or speaker verification. The speech reference system 300 is implemented in a service node or intelligent peripheral (SN/IP). When the speech reference system 300 is implemented in a service node, it is directly connected to a telephone central office—service switching point (CO/SSP) 304–308. The central office—service switching points 304–308 are connected to a plurality of telephones 310–320. When the speech reference system 300 is implemented in an intelligent peripheral, it is connected to a service control point (SCP) 322. In this scheme a call from one of the plurality of telephones 310–320 invoking a special feature, such as speech recognition, requires processing by the service control point 322. Calls requiring special processing are detected at CO/SSP 304–308. This triggers the CO/SSP 304–308 to interrupt call processing while the CO/SSP 304–308 transmits a query to the SCP 300, requesting information to recognize a word spoken by user. The query is carried over a signal system 7 (SS7) link 324 and routed to the appropriate SCP 322 by a signal transfer point (STP) 326. The SCP 322 sends a request for the intelligent peripheral 300 to perform speech recognition. The speech reference system 300 can be implemented using a computer capable of reading and executing computer readable instructions stored on a computer readable storage medium 328. The instructions on the storage medium 328 instruct the computer how to perform the enrollment method according to the invention.

Figure 9A:
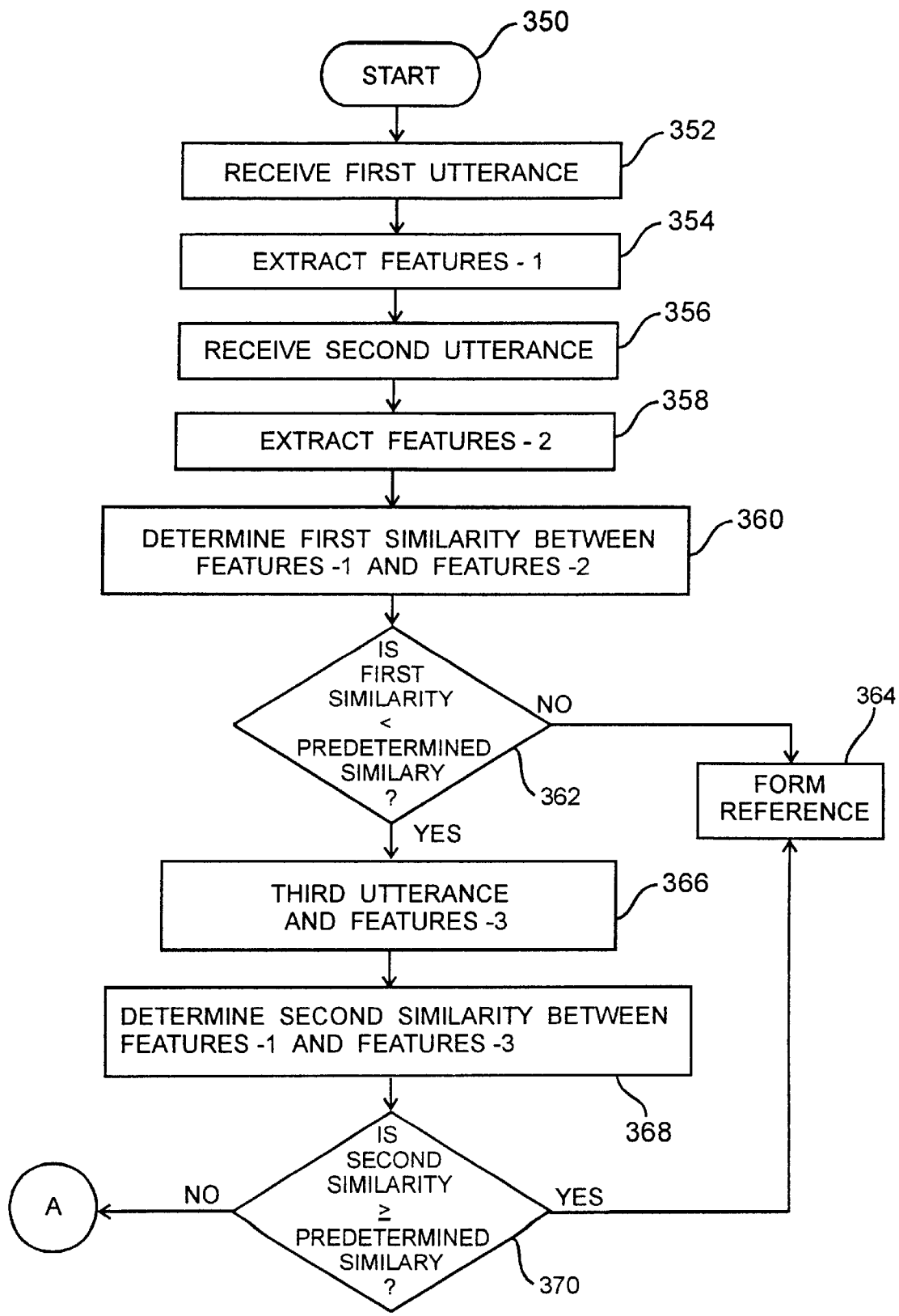
FIGS. 9a & b are flow charts of an embodiment of the steps used in the speech reference enrollment method.
Figure 9B:
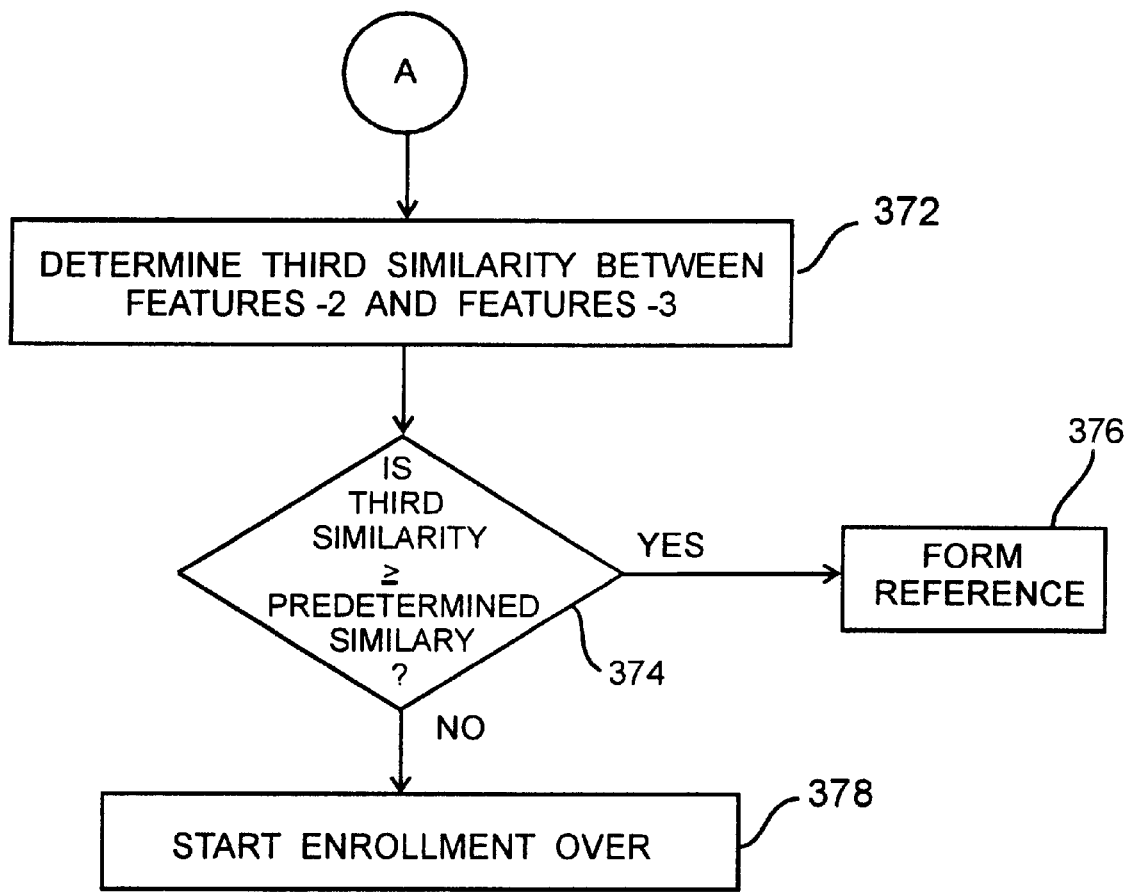

FIGS. 9a & b are flow charts of the speech reference enrollment method. This method can be used with any speech reference system, including those used as part of an intelligent telephone network as shown in FIG. 8. The enrollment process starts, step 350, by receiving a first utterance of a vocabulary word from a user at step 352. Next, a plurality of features are extracted from the first utterance at step 354. In one embodiment, the plurality of features are the cepstrum coefficients of the utterance. At step 356, a second utterance is received. In one embodiment the first utterance and the second utterance are received in response to a request that the user speak the vocabulary word. Next, the plurality of features are extracted from the second utterance at step 358. Note that the same features are extracted for both utterances. At step 360, a first similarity is determined between the plurality of features from the first utterance and the plurality of features from the second utterance. In one embodiment, the similarity is determined using a hidden Markov model Veterbi scoring system. Then it is determined if the first similarity is less than a predetermined similarity at step 362. When the first similarity is not less than the predetermined similarity, then a reference pattern (reference utterance) of the vocabulary is formed at step 364. The reference pattern, in one embodiment, is an averaging of the features from the first and second utterance. In another embodiment, the reference pattern consists of storing the feature from both the first utterance and the second utterance, with a pointer from both to the vocabulary word.

When the first similarity is less than the predetermined similarity, then a third utterance (third digitized utterance) is received and the plurality of features from the third utterance are extracted at step 366. Generally, the utterance would be received based on a request by the system. At step 368, a second similarity is determined between the features from the first utterance and the third utterance. The second similarity is calculated using the same function as the first similarity. Next, it is determined if the second similarity is greater than or equal to the predetermined similarity at step 370. When the second similarity is greater than or equal to the predetermined similarity, a reference is formed at step 364. When the second similarity is not greater than or equal to the predetermined similarity, then a third similarity is calculated between the features from the second utterance and the third utterance at step 372. Next, it is determined if the third similarity is greater than or equal to the predetermined similarity at step 374. When the third similarity is greater than or equal to the predetermined similarity, a reference is formed at step 376. When the third similarity is not greater than or equal to the predetermined similarity, starting the enrollment process over at step 378. Using this method the enrollment process avoids incorporating unexpected noise or other abnormalities into the reference pattern.

Figure 10:
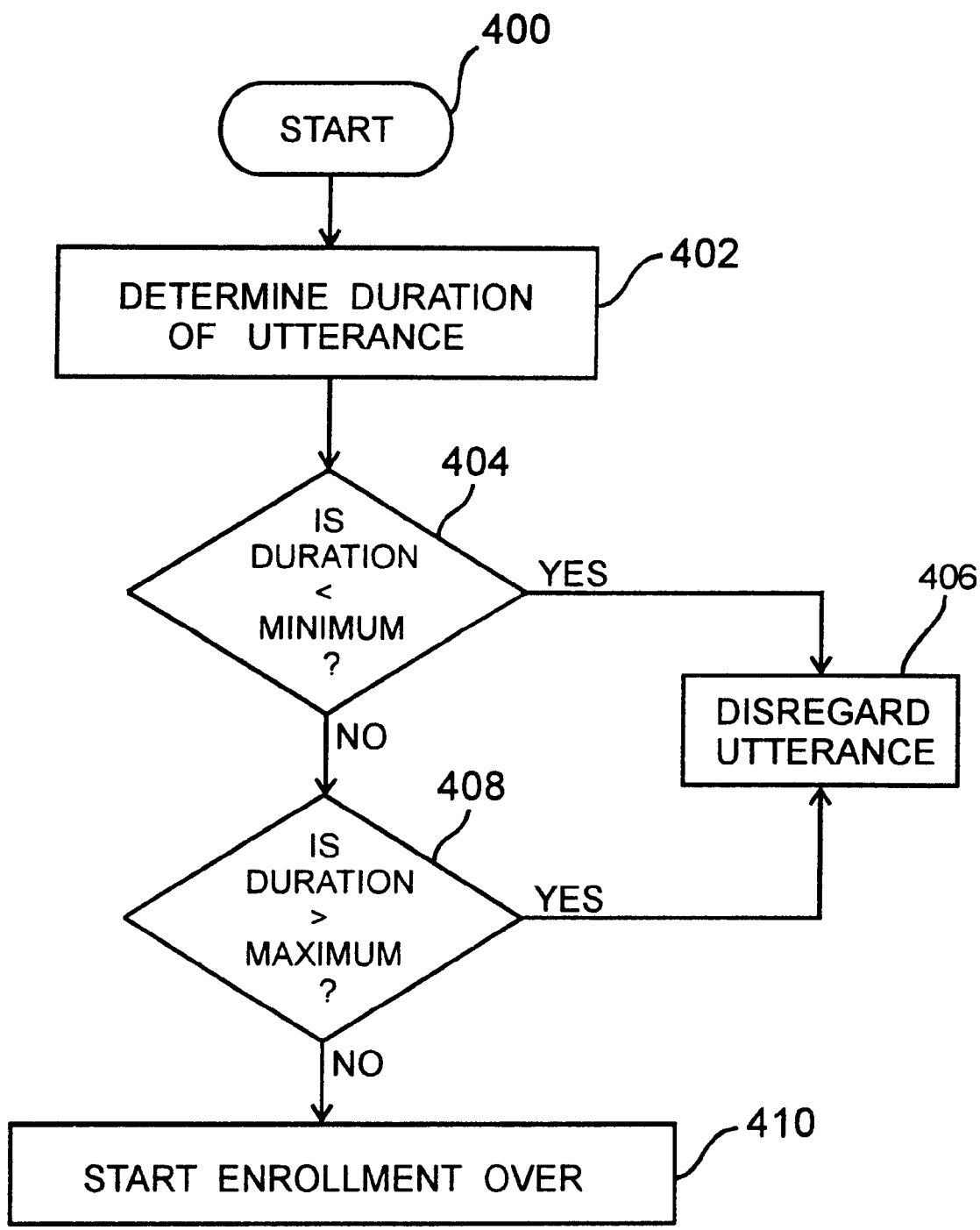
FIG. 10 is a flow chart of an embodiment of the steps used in an utterance duration check.

In one embodiment of the speech reference enrollment method of FIGS. 9a & b, a duration check is performed for each of the utterances. The duration check increases the chance that background noise will not be considered to be the utterance or part of an utterance. A flow chart of the duration check is shown in FIG. 10. The process starts, step 400, by determining the duration of the utterance at step 402. Next, it is determined if the duration is less than a minimum duration at step 404. When the duration is less than the minimum duration, the utterance is disregarded at step 406. In one embodiment, the user is then requested to speak the vocabulary word again and the process is started over. When the duration is not less than the minimum duration, it is determined if the duration is greater than a maximum duration at step 408. When the duration is greater than a maximum duration, the utterance is disregarded at step 406. When the duration is not greater than the maximum duration, the utterance is kept for further processing at step 410.

Figure 11:
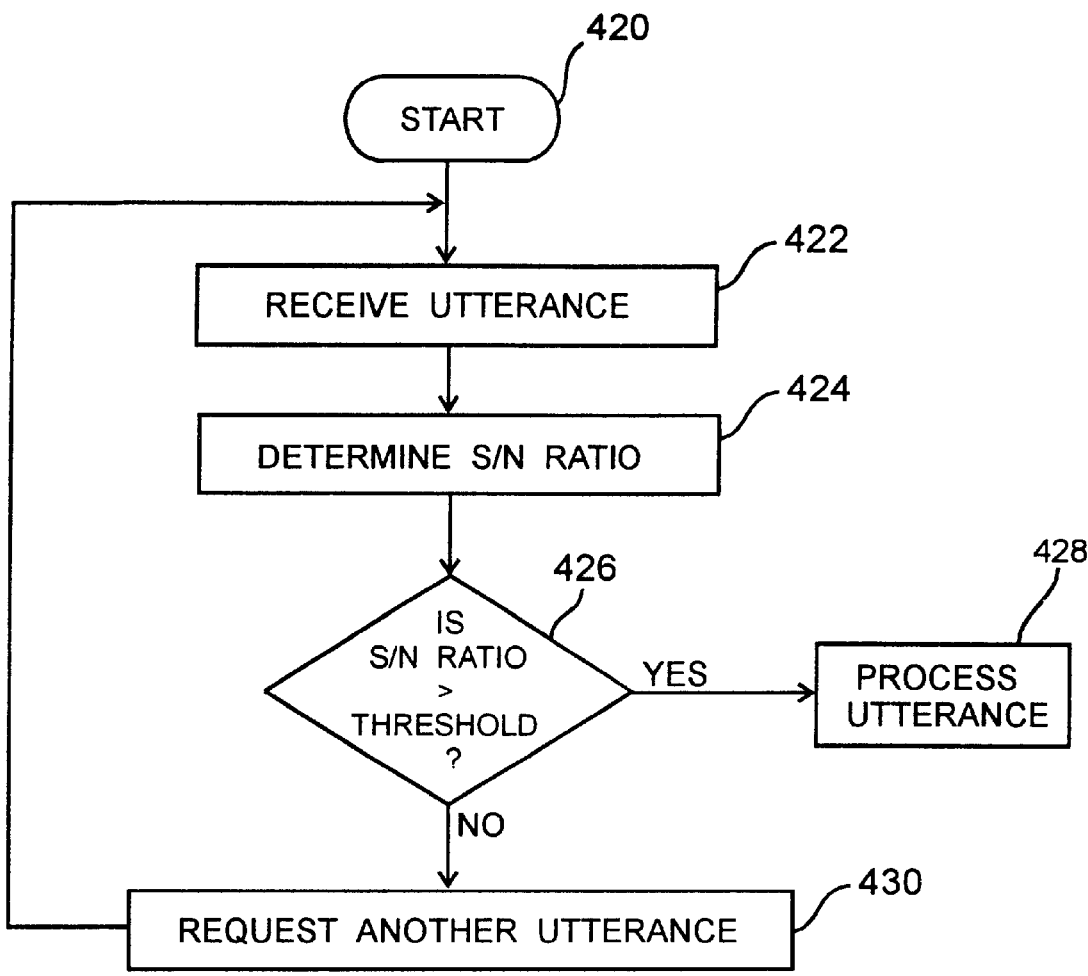
FIG. 11 is a flow chart of an embodiment of the steps used in a signal to noise ratio check.

Another embodiment of the speech reference enrollment method checks if the signal to noise ratio is adequate for each utterance. This reduces the likely that a noisy utterance will be stored as a reference pattern. The method is shown in the flow chart of FIG. 11. The process starts, step 420, by receiving an utterance at step 422. Next, the signal to noise ratio is determined at step 424. At step 426, it is determined if the signal to noise ratio is greater than a threshold (predetermined signal to noise ratio). When the signal to noise ratio is greater than the threshold, then the utterance is processed at step 428. When the signal to noise ratio is not greater than the threshold, another utterance is requested at step 430.

Figure 12:
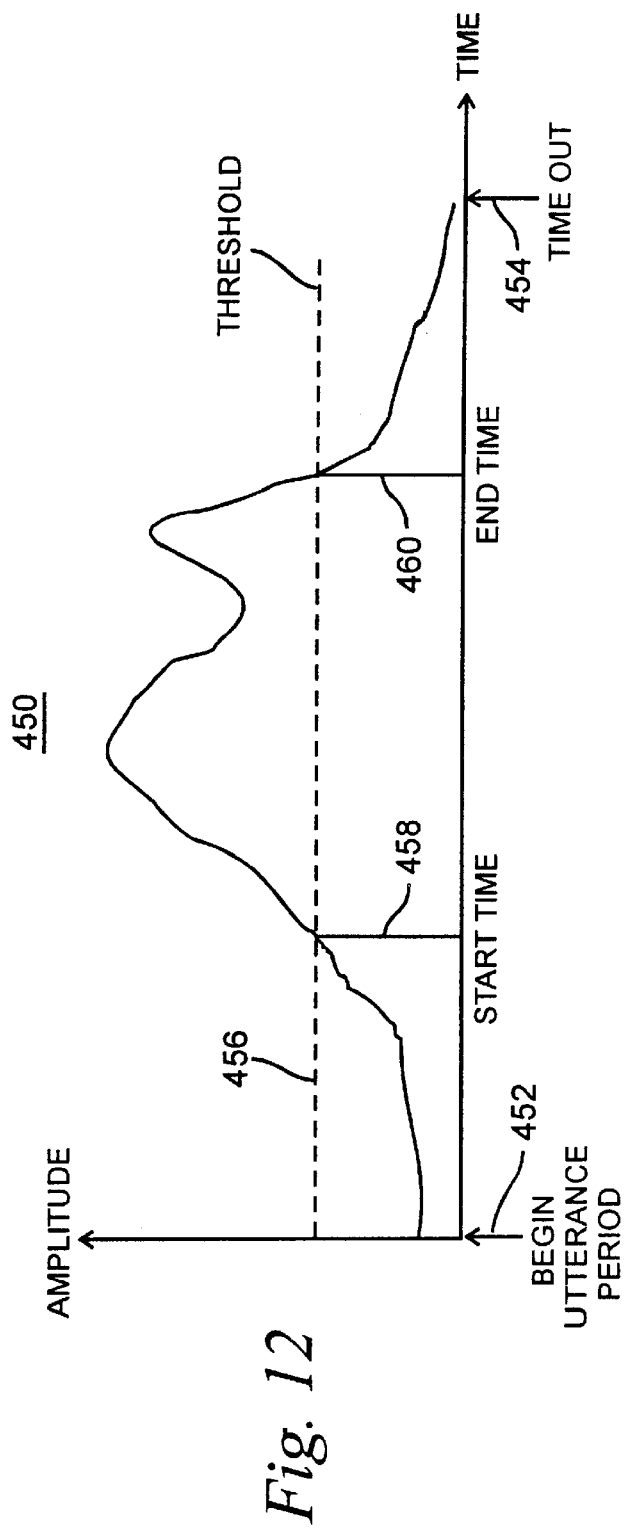
FIG. 12 is a graph of the amplitude of an utterance versus time.

FIG. 12 is a graph 450 of the amplitude of an utterance versus time and shows one embodiment of how the duration of the utterance is determined. The speech reference system requests the user speak a vocabulary which begins the response period (utterance period) 452. The response period ends at a timeout (timeout period) 454 if no utterance is detected. The amplitude is monitored and when it crosses above an amplitude threshold 456 it is assumed that the utterance has started (start time) 458. When the amplitude of the utterance falls below the threshold, it is marked as the end time 460. The duration is calculated as the difference between the end time 460 and the start time 458.

Figure 13:
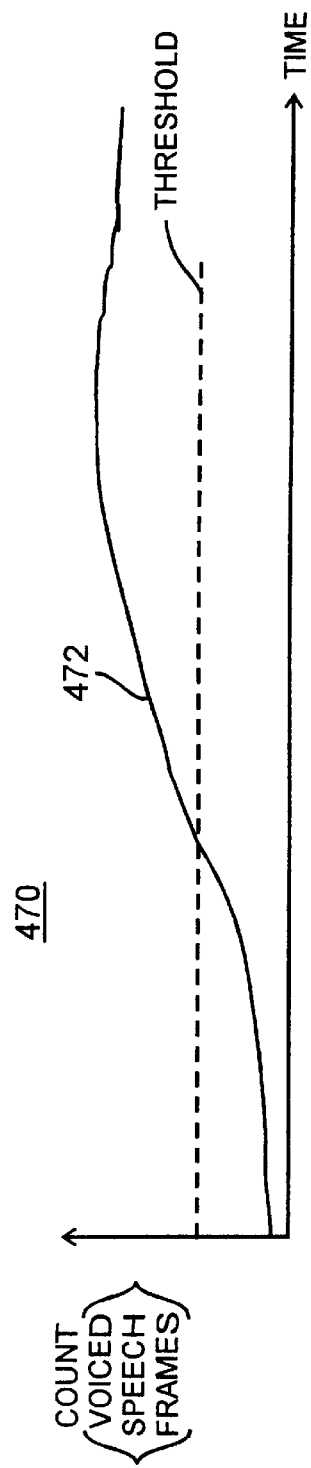
FIG. 13 is a graph of the number of voiced speech frames versus time for an utterance.

In another embodiment of the invention, the number (count) of voiced speech frames that occur during the response period or between a start time and an end time is determined. The response period is divided into a number of frames, generally 20 ms long, and each frame is characterized either as a unvoiced frame or a voiced frame. FIG. 13 shows a graph 470 of the estimate of the number of the voiced speech frames 472 during the response period. When the estimate of the number of voiced speech frames exceeds a threshold (predetermined number of voiced speech frames), then it is determined that a valid utterance was received. When the number of voiced speech frames does not exceed the threshold, then it is likely that noise was received instead of a valid utterance.

Figure 14:
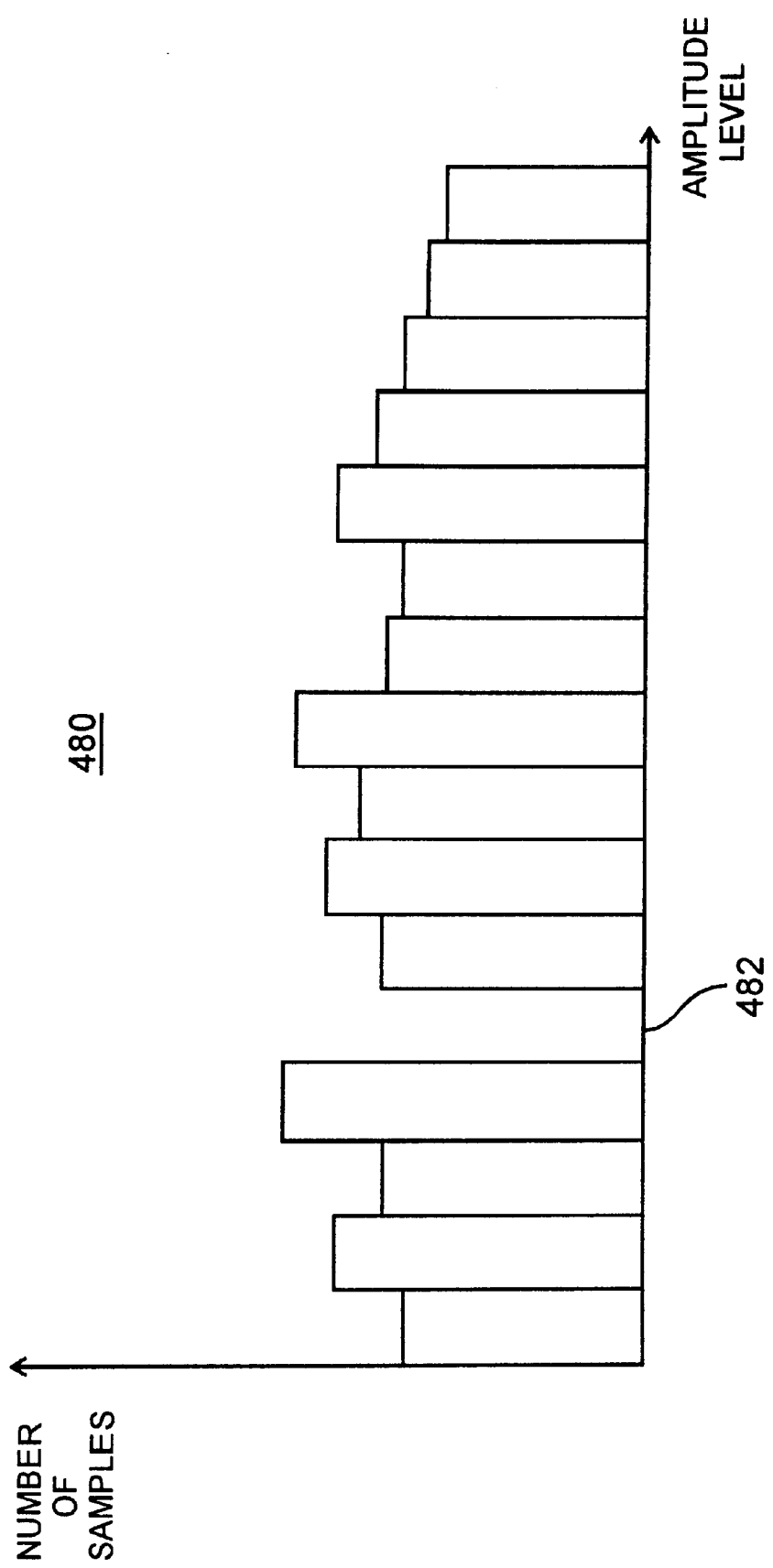
FIG. 14 is an amplitude histogram of an utterance.

In another embodiment an amplitude histogram of the utterance is performed. FIG. 14 is an amplitude histogram 480 of an utterance. The amplitude histogram 480 measures the number of samples in each bit of amplitude from the digitizer. When a particular bit 482 has no or very few samples, the system generates a warning message that a problem may exist with the digitizer. A poorly performing digitizer can degrade the performs of the speech reference system.

Figure 15:
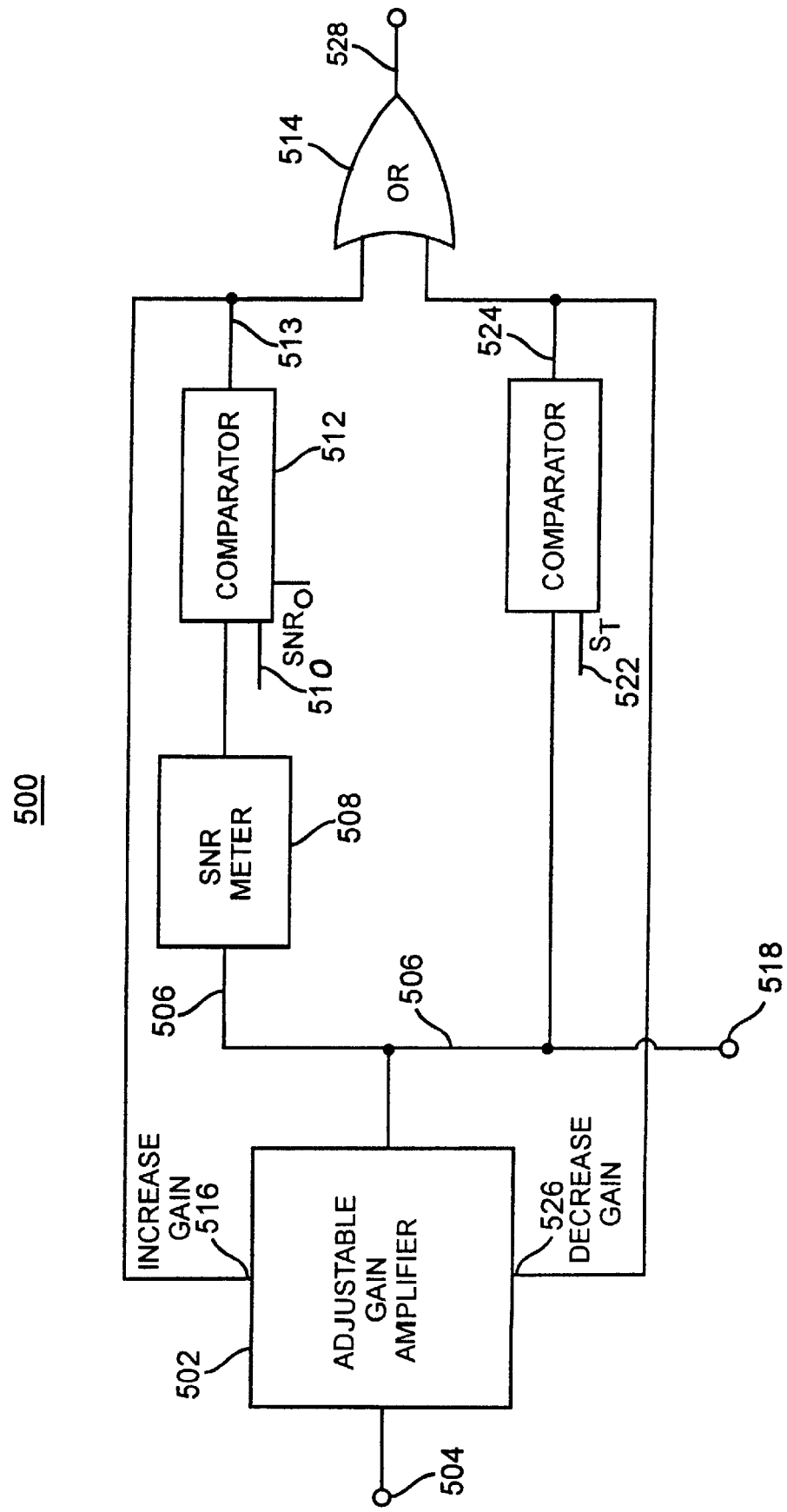
FIG. 15 is a block diagram of an automatic gain control circuit.

In another embodiment, an automatic gain control circuit is used to adjust the amplifier gain before the features are extracted from the utterance. FIG. 15 is a block diagram of an automatic gain control circuit 500. The circuit 500 also includes some logic to determine if the utterance should be kept for processing or another utterance should be requested. An adjustable gain amplifier 502 has an input coupled to an utterance signal line (input signal) 504. The output 506 of the amplifier 502 is connected to a signal to noise ratio meter 508. The output 510 of the signal to noise ratio meter 508 is coupled to a comparator 512. The comparator 512 determines if the signal to noise ratio is greater than a threshold signal to noise ratio 514. When the signal to noise ratio is less than the threshold a logical one is output from the comparator 512. The output 513 of the comparator 512 is coupled to an OR gate 515 and to an increase gain input 516 of the adjustable gain amplifier 502. When the output 513 is a logical one, the gain of the amplifier 516 is increased by an incremental step.

The output 506 of the amplifier 502 is connected to a signal line 518 leading to the feature extractor. In addition, the output 506 is connected to an amplitude comparator 520. The comparator 520 determines if the output 506 exceeds a saturation threshold 522. The output 524 is connected to the OR gate 515 and a decrease gain input 526 of the amplifier 502. When the output 506 exceeds the saturation threshold 522, the comparator 520 outputs a logical one that causes the amplifier 502 to reduce its gain by an incremental step. The output of the OR gate 515 is a disregard utterance signal line 528. When the output of the OR gate is a logical one the utterance is disregarded. The circuit reduces the chances of receiving a poor representation of the utterance due to incorrect gain of the input amplifier.

Thus there has been described a speech reference enrollment method that significantly reduces the chances of using a poor utterance for forming a reference pattern. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A speech recognition, verification and enrollment system, comprising:
    an adjustable gain amplifier connected to an input speech signal;
    a signal to noise meter connected to an output of the adjustable gain amplifier;
    a signal to noise comparator having a first input connected to the signal to noise meter and a second input connected to a threshold, an output of the signal to noise comparator is connected to a gain input of the adjustable gain amplifier;
    a feature extractor is connected to the output of the adjustable gain amplifier; and
    a feature comparator is connected to the output of the feature extractor, wherein the gain input can be adjusted both up and down during the speech input.

2. The system of claim 1, further including,
    an amplitude comparator having a first input connected to the output of the adjustable gain amplifier and a second input connected to a saturation threshold;
    an OR gate having a first input connected to an output of the amplitude comparator and a second input connected to the output of the signal to noise comparator.

3. The system of claim 1, further including,
    a decision weighting and combining system connected to an output of the feature comparator.

4. The system of claim 1, wherein the feature extractor determines the number of voiced speech frames that occur during a response period.

5. The system of claim 1, further including an amplitude threshold detector connected to the input speech signal.

6. The system of claim 5, further including a timer connected to an output of the amplitude threshold detector.

7. The system of claim 1, wherein the feature extractor forms an amplitude histogram.

* * * * *